(12) United States Patent
Arnott et al.

(10) Patent No.: US 9,239,861 B2
(45) Date of Patent: Jan. 19, 2016

(54) TECHNIQUES FOR HIERARCHY VISUALIZATION FOR ORGANIZATIONS

(75) Inventors: Andrew Arnott, Kirkland, WA (US); Jeffrey Kohler, Redmond, WA (US); Hazem Abolrous, Bellevue, WA (US); Bradley Van Ee, Woodinville, WA (US); Phillip Su, Kirkland, WA (US); Cedric Dussud, Bellevue, WA (US)

(73) Assignee: MICROSOFT TENCHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/359,204

(22) Filed: Jan. 26, 2012

(65) Prior Publication Data

US 2013/0198179 A1    Aug. 1, 2013

(51) Int. Cl.
*G06F 17/30* (2006.01)
*G06Q 10/06* (2012.01)
*G06Q 10/10* (2012.01)

(52) U.S. Cl.
CPC .... *G06F 17/30424* (2013.01); *G06F 17/30893* (2013.01); *G06Q 10/06* (2013.01); *G06Q 10/105* (2013.01)

(58) Field of Classification Search
CPC .................. G06F 17/30424; G06F 17/30893; G06F 17/30303
USPC .................................. 707/736, 999.004, 748
See application file for complete search history.

(56) References Cited

U.S. PATENT DOCUMENTS

| | | | |
|---|---|---|---|
| 6,208,986 B1 | 3/2001 | Schneck et al. | |
| 6,539,379 B1* | 3/2003 | Vora | G06F 17/30554 707/999.003 |
| 7,343,365 B2 | 3/2008 | Farnham et al. | |
| 7,519,575 B1 | 4/2009 | Simpson et al. | |
| 7,801,879 B2 | 9/2010 | Jones | |
| 2004/0073918 A1* | 4/2004 | Ferman | H04H 60/46 725/34 |
| 2005/0154607 A1* | 7/2005 | Terzidis | G06Q 99/00 715/853 |
| 2007/0130244 A1* | 6/2007 | Swanburg et al. | 709/200 |
| 2008/0028069 A1* | 1/2008 | Urbanek | G06Q 10/10 709/224 |
| 2008/0091441 A1* | 4/2008 | Flammer | G06Q 10/06 705/320 |
| 2009/0063268 A1* | 3/2009 | Burgess | G06Q 30/0239 705/14.39 |
| 2009/0171690 A1* | 7/2009 | Lubarski | G06F 17/3089 705/342 |
| 2011/0126126 A1 | 5/2011 | Blair | |
| 2012/0023455 A1* | 1/2012 | Chen et al. | 715/853 |

(Continued)

OTHER PUBLICATIONS

"Web Active Directory", Retrieved at <<http://www.webactivedirectory.com/products/peoplesearch/>>, Retrieved Date: Aug. 24, 2011, pp. 2.

(Continued)

*Primary Examiner* — Phong Nguyen
(74) *Attorney, Agent, or Firm* — Jessica Meyers; Doug Barker; Micky Minhas

(57) ABSTRACT

Techniques for hierarchy visualization for organizations are described. An apparatus may comprise an information retrieval component and a profile construction component. The information retrieval component may be generally operative to retrieve information regarding a plurality of individuals from a plurality of data repositories. The profile construction component may be generally operative to create a plurality of profiles from the retrieved information, wherein each profile combines information regarding an individual from the plurality of data repositories. Other embodiments are described and claimed.

20 Claims, 9 Drawing Sheets

(56) References Cited

U.S. PATENT DOCUMENTS

2012/0330928 A1* 12/2012 Paulk ............... G06F 17/30303
707/722
2014/0181089 A1* 6/2014 Desmond .......... G06F 17/30268
707/722

OTHER PUBLICATIONS

"Corporate / Employee Directory Search", Retrieved at <<http://www.manageengine.com/products/self-service-password/employee-search.html>>, Retrieved Date: Aug. 24, 2011, p. 1.

* cited by examiner

| | Name \| Title 324 | Department 326 | Email Alias 328 |
|---|---|---|---|
| | | | 330 |
| | Bryan Xiong | Legal | bryanx |
| | Associate Counsel | | |
| | Jenee Xiong 344 | Services Engineering | jxiong |
| | Senior Project Manager | 346 | 348 |
| | | | 350 |
| | Ming Xiong | Sales | mbxiong |
| | Sales Associate | | |
| | Rachel Xiong | Executive Leadership | rvx |
| | Chief Financial Officer | | 360 |

FIG. 3

FIG. 4

TECHNIQUES FOR HIERARCHY VISUALIZATION FOR ORGANIZATIONS

BACKGROUND

Information regarding the makeup of large organizations has become increasingly available in electronic form. However, information regarding individuals within that organization is frequently spread among multiple data repositories, making a search of all the available information laborious for a user. Further, information retrieved from multiple repositories may be laborious to correlate, making more difficult the task of building a unified profile for an individual. Similarly, if a searching user wishes to learn the relationship between an individual and others in their organization, this relationship information may also be spread amongst the multiple data repositories. As such, a user wishing to gather information about an individual and their relationship to others in an organization may find themselves inefficiently attempting to perform a multitude of searches and manage a plethora of unconnected information. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for hierarchy visualization for an organization. Some embodiments are particularly directed to techniques for visualizing the hierarchy of an organization using information gathered from a plurality of data repositories. In one embodiment, for example, an apparatus may comprise an information retrieval component operative to retrieve information regarding a plurality of individuals from a plurality of data repositories and a profile construction component operative to create a plurality of profiles from the retrieved information, wherein each profile combines information regarding an individual from the plurality of data repositories. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates an example search interface and search results for the profile system of FIG. 1.

FIG. 4 illustrates a chain-of-command view of a profile for a searched-for individual.

DETAILED DESCRIPTION

Figure 1:
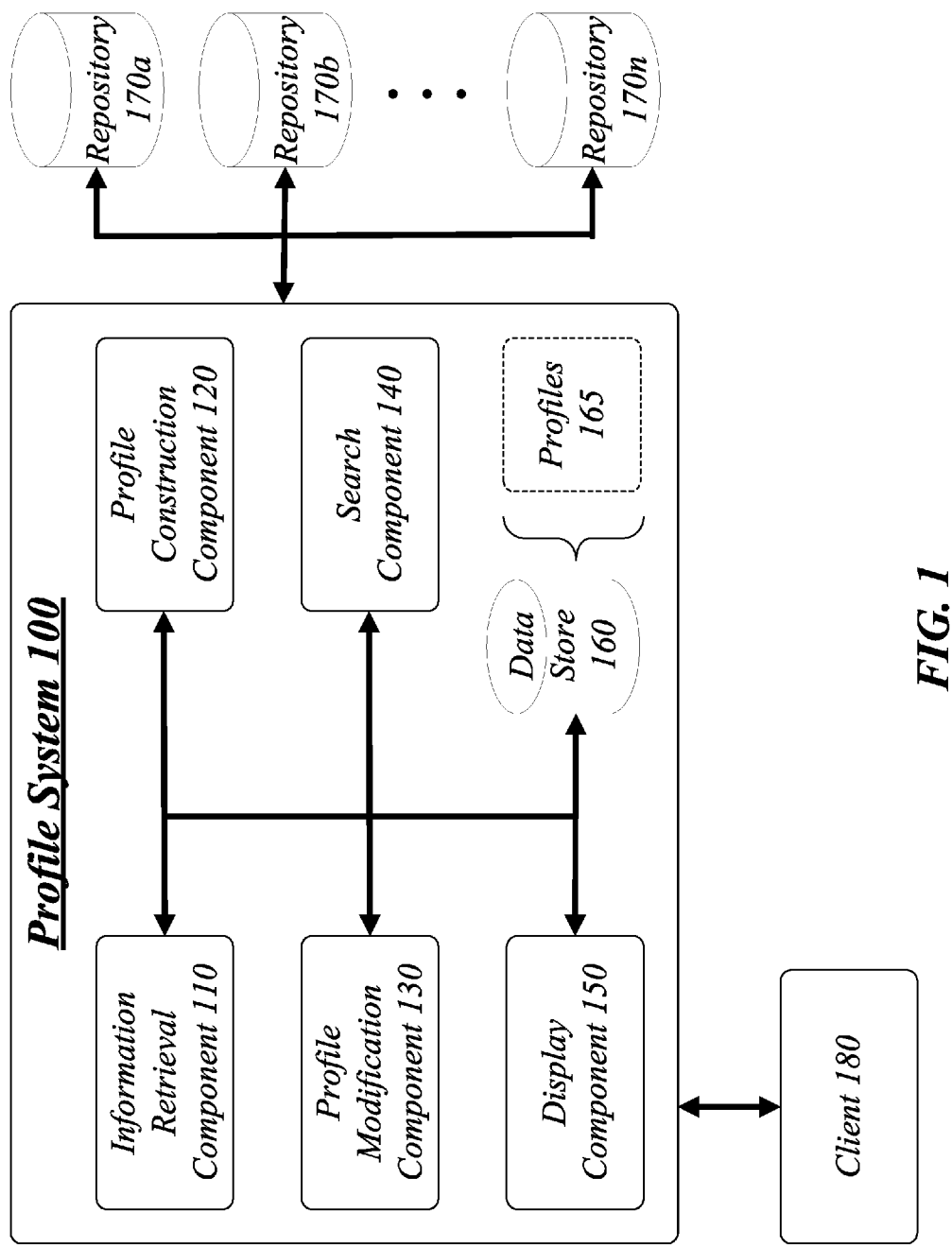
FIG. 1 illustrates an embodiment of a profile system for hierarchy visualization for organizations.

Various embodiments are directed to techniques for hierarchy visualization for organizations. Most organizations possess an internal hierarchy that defines and reflects the organization of decision making, management oversight, information flow, and specialized expertise. For example, a supervisor/supervisee relationship reflects a division between what decisions are made by the supervisor and what decisions are made by the supervisee, the extent to which decisions by the supervisee are reviewed by the supervisor, the distribution of organizational knowledge, and the possession of specialized expertise. This relationship may exist for every member of an organization, such that a hierarchy can be constructed showing, for each member of an organization, who, if anyone, supervises that member and who, if anyone, is supervised by that member. A visualization of these relationships may aid a member of an organization to determine the proper person to contact to aid them with regards to an administrative or technical matter. For example, an employee who wishes to contact another employee's supervisor in regards to a personnel dispute may be aided by a system which collates the necessary information to determine this relationship, programmatically determines the relationship, and provides for the search and visualization of these relationships.

Further organizational relationships may exist. Individuals may be organized into working groups, departments, or other working structures, such that some members of an organization may be horizontally grouped together as peers, without a supervisor/supervisee relationship existing between them. For example, an employee in technical support wishing to contact a developer in regards to an uncovered software problem may be greatly aided by an ability to search for those individuals responsible for the software and the ability to visually examine the relationship between these individuals so as to determine whom to contact to communicate the problem.

Individuals or entities not part of the organization may still be relevant to the construction of a hierarchy for an organization, such as relationships with outside suppliers, vendors, distributors, contractors, or any external entities with which the organization has a relationship. For example, a salesman may have a relationship with a distributor such that a visualization of the relationship between the salesman and the distributor can aid an employee wishing to communicate with the distributor to identify the member of the organization who serves as the internal contact with the distributor.

Various embodiments are particularly directed to the problem of determining and visualizing hierarchies given that while sufficient information may already exist to determine these relationships, this information may be spread through multiple data repositories, not all of which may be searchable by individual users, such that a user has no practical method of determining these relationships for himself or herself despite the basic existence of the information. As a result, an automated system for collecting, organizing, and visualizing this disparate information may significantly aid a user in performing searches and visualizing the result of searches for organizational information. Further, after collecting and organizing this information in a unified manner, the organized information may be made available for programmatic searches—in contrast to direct user searches—expanding the usefulness of any application which may make use of organizational data. As such, the enclosed embodiments can improve the affordability, scalability, modularity, extendibility, and interoperability for an operator or user of an organization search system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a profile system 100. In one embodiment, the profile system 100 may comprise a computer-implemented profile system 100 having one or more software applications and/or components. Although the profile system 100 shown in FIG. 1 has a limited number of elements in a certain topology, it may be appreciated that the profile system 100 may include more or less elements in alternate topologies as desired for a given implementation.

As shown in the illustrated embodiment of FIG. 1, the profile system 100 includes an information retrieval component 110, a profile construction component 120, a profile modification component 130, a search component 140, a display component 150, and a data store 160. The information retrieval component 110 may be generally operative to retrieve information regarding a plurality of individuals from a plurality of data repositories 170a-n. The profile construction component 120 may be generally operative to create a plurality of profiles 165 from the retrieved information, wherein each profile combines information regarding an individual from the plurality of data repositories 170a-n. The profile modification component 130 may be generally operative to receive additional information from a user and to add the additional information to a profile. The search component 140 may be generally operative to receive a search request and to identify one or more profiles which satisfy the search request. The display component 150 may be generally operative to create a display view showing a profile for an individual, the display view comprising a visual representation of hierarchical relationships between the individual and one or more other individuals. The data store 160 may be generally operative to store the plurality of profiles 165.

In general, the information retrieval component 110 may be operative to retrieve information regarding a plurality of individuals from a plurality of data repositories 170a-n. A data repository may refer to any server, device, distributed service, or system for storing data. A network-accessible data repository may refer to a data repository operative to receive data-retrieval requests sent over a network. A first and second data repository may be said to be distinct from each other if separate data-retrieval requests are needed to retrieve data from both the first data repository and the second data repository. A first and second data repository may be said to be of a different type—may be said to be heterogeneous from each other—if different application programming interfaces (APIs) are used for accessing the first and second data repositories. The plurality of data repositories 170a-n may comprise both distinct and heterogeneous data repositories. By virtue of being able to collect and combine information from distinct and heterogeneous data repositories, the information retrieval component 110 may simplify the process of searching for information regarding an individual. Examples of server applications hosting data repositories may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples of web services hosting data repositories may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

Information regarding an individual may comprise any information about an individual relevant to the construction of an organization profile for the individual within an organizational hierarchy. This information may include, without limitation, the individual's name, title, contact information (including email, phone, mail, instant messaging, and any other form of communication), department, group, picture or photo, knowledge areas, supervisor, supervisees, or vendor contacts. The information may include tags for the individual, the tags indicating any of, without limitation, areas of expertise, group membership, active projects, titles, or any other individual-specific tags.

In some embodiments, at least one of the plurality of data repositories may be a directory server storing address-book information. In these embodiments, the information retrieved from the at least one data repository may comprise address-book information from stored address books for the plurality of individuals. An address book for an individual may contain an individual's name, title, contact information (including email, phone, mail, instant messaging, and any other form of communication), department, group, picture or photo, knowledge areas, supervisor, supervisees, vendor contacts, or any other address-book relevant information.

In some embodiments, the retrieved information may include information regarding individuals who are not part of the organization. For example, the information retrieved from the data repositories 170a-n may include information regarding external contacts such as vendors, suppliers, distributors, or any other external contacts.

In various embodiments, the information retrieval component 110 may be operative to retrieve updated information from the plurality of data repositories 170a-n. Updated information may include, without limitation, information regarding new individuals who do not currently have profiles, new information regarding individuals who already have profiles, or information indicating that an individual with a profile has left the organization.

In general, the profile construction component 120 may be operative to create a plurality of profiles 165 from the retrieved information, wherein each profile 165 combines information regarding an individual from the plurality of data repositories. As previously discussed, the information retrieved may include, without limitation, the individual's name, title, contact information (including email, phone, mail, instant messaging, and any other form of communication), department, group, picture or photo, knowledge areas, supervisor, supervisees, or vendor contacts. The retrieved information may include tags for the individual, the tags indicating any of, without limitation, areas of expertise, group membership, active projects, titles, or any other individual-specific tags. In some embodiments, the information retrieved from a first data repository regarding an individual may comprise a first set of information and the information retrieved from a second data repository regarding the individual may comprise a second set of information. The first set of information and the second set of information may both include a common identifier for the individual—such as a name, employee number, email address or other identifier distinct within an organization—but may also include distinct information, such that each of the first and second sets of information contain at least one piece of information not contained in the other. The profile construction component 120 may therefore be operative to match the first set of information to the second set of information using the common identifier for the individual and to produce a third set of information comprising, without duplication, the information from the first and second sets. Mathematically, the third set may be considered a union of the first set and the second set.

In various embodiments, a profile 165 for an individual may comprise the union of all sets of information from all data repositories which are associated with the individual. In various embodiments, the profile construction component 120 may be operative to construct the 165 profile for an individual by searching the information retrieved from the plurality of data repositories 170a-n to identify those sets which contain the common identifier for the individual and then performing a union of those identified sets of information. In various embodiments, the profile construction component 120 may be operative to identify a common identifier for an individual which does not yet have a profile 165 by searching the retrieved information for identifiers which are not yet associated with constructed profiles. In various embodiments, the profile construction component 120 is operative to combine a retrieved picture of an individual with a profile associated with the individual.

In various embodiments, a created plurality of profiles 165 may comprise a hierarchical structuring of an organization, the hierarchical structuring automatically created based on the retrieved information regarding the plurality of individuals. A hierarchical structuring of an organization may comprise any structuring of an organization which creates a hierarchy—a ranked ordering according to status—wherein a comparison between any two individuals, such as a first individual and a second individual, may be made to determine exactly one of: the first individual being of the same rank as the second individual, the first individual being of a higher rank than the second individual, or the first individual being of a lower rank than the second individual. The hierarchical structuring of an organization may accommodate determining, for every individual in the organization, that individual's immediate supervisor (if any) and immediate subordinates (if any).

In some embodiments, the hierarchical structuring of an organization may comprise an explicitly-stored hierarchical structuring such that a unified data structure stores the plurality of supervisory and subordinate links between individuals within the organization. In some embodiments, the hierarchical structuring of an organization may comprise an implicitly-stored hierarchical structuring. An implicitly-stored hierarchical structuring may comprise a collection of profiles 165 such that, for each individual in the organization, the associated profile 165 contains that individual's immediate supervisor (if any) and immediate subordinates (if any), such that the hierarchy of the organization can be determined by traversing the supervisory and subordinate relationships contained within the plurality of profiles 165.

In some embodiments, the constructed profiles 165 may include profiles for individuals who are not part of the organization. For example, if the information retrieved from the data repositories 170a-n included information regarding external contacts such as vendors, suppliers, distributors, or any other external contact, profiles may be constructed for these external contacts. An external contact may have, instead of a supervisory or subordinate relationship, a contact relationship with one or more members of the organization.

In various embodiments, the profile construction component 120 may be operative to use updated information retrieved from the plurality of data repositories 170a-n by the information retrieval component 110. The profile construction component 120 may be operative to construct new profiles 165 for new individuals (such as individuals who joined the organization since the last retrieval of information from the data repositories 170a-n), update the profiles 165 of individuals who already have profiles 165 with new retrieved information, or delete or mark as inactive the profiles 165 of individuals who have left the organization since the last retrieval of information from the data repositories 170a-n.

In general, the profile modification component 130 may be operative to receive additional information from a user and to add the additional information to a profile 165. A user may comprise a member of an organization using a client device 180, such that the client device 180 is a distinct device from the one or more devices comprising profile system 100. The additional information may comprise information of a type already contained within the profile 165, or may comprise information of a type not already contained within the profile 165. The additional information may comprise replacement information for the information already contained within the profile 165, such as replacing a profile picture with a more recent photo or updating contact information. In general, the profile modification component 130 may be operative to make any change, additional, or removal of information from a profile 165 in response to a manual user request that the profile generation component 120 would be operative to make in regards to retrieved updated information.

In general, the search component 140 may be operative to receive a search request and to identify one or more profiles 165 which satisfy the search request. The search request may comprise, without limitation, a name, a partial name, a title, a piece of contact information (including email, phone, mail, instant messaging, and any other form of communication), a department, a group, a knowledge area, or a vendor. The search request may comprise a tag, the tags indicating any of, without limitation, an area of expertise, group membership, an active project, a title, or any other tag which may be or have been applied to an individual. Generally, the search request may comprise any requests which may be matched, completely or partially, with any information stored in the plurality of profiles 165. Identifying one or more profiles 165 which satisfy the search request may comprise any of the known techniques for making complete or partial matches between a search term and stored information.

In various embodiments, the search component 140 may be operative to receive the search request through an application programming interface (API), the search component 140 operative to return the one or more identified profiles 165 using the API. The API may comprise an open or published standard for communicating with the profile system 100. The API may be operative to empower external applications to perform searches and receive the results of searches from the profile system 100. External application may comprise, without limitation, an email application, an address book application, a productivity application, or any other application which performs functions which may be enhanced through access to a profile system 100. Examples for client applications may include, without limitation, MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC.

In various embodiments, the API may comprise a web-based API in which a search request may be initiated by sending a request to a web server using a specially-formatted URL, the URL composed to contain the search request. In these embodiments, the returned identified profiles 165 may comprise an HTML-formatted response in which the returned profile information is formatted in the HTML format.

In various embodiments, the API may comprise an XML-based API in which a search request may be initiated by sending an XML-formatted search request to a server. In these embodiments, the returned identified profiles 165 may comprise an XML-formatted response in which the returned profile information is formatted in the XML format.

In various embodiments, the API may be operative to empower external applications to make additions or modifications to the stored profiles 165. In general, the profile modification component 130 may be operative to receive from an external application any addition or modification to the stored profiles 165 that could be directly received from a user.

In general, the display component 150 may be operative to create a display view of a profile for an individual. The display view may comprise any or all of the information contained within the profile for the individual, including both information retrieved from the data repositories 170a-n and any additional information added by the profile management component 130. The display view may comprise a standardized subset of the information contained with the profile. The display view may comprise a visual representation of hierarchical relationships between the individual and one or more other individuals. The display view may comprise a visual representation of the entire chain of command or supervision leading from the head of an organization to the individual. The display view may comprise a visual representation of the immediate subordinates of the individual. The display view may comprise a visual representation of one or more external contacts for an individual.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

Figure 2:
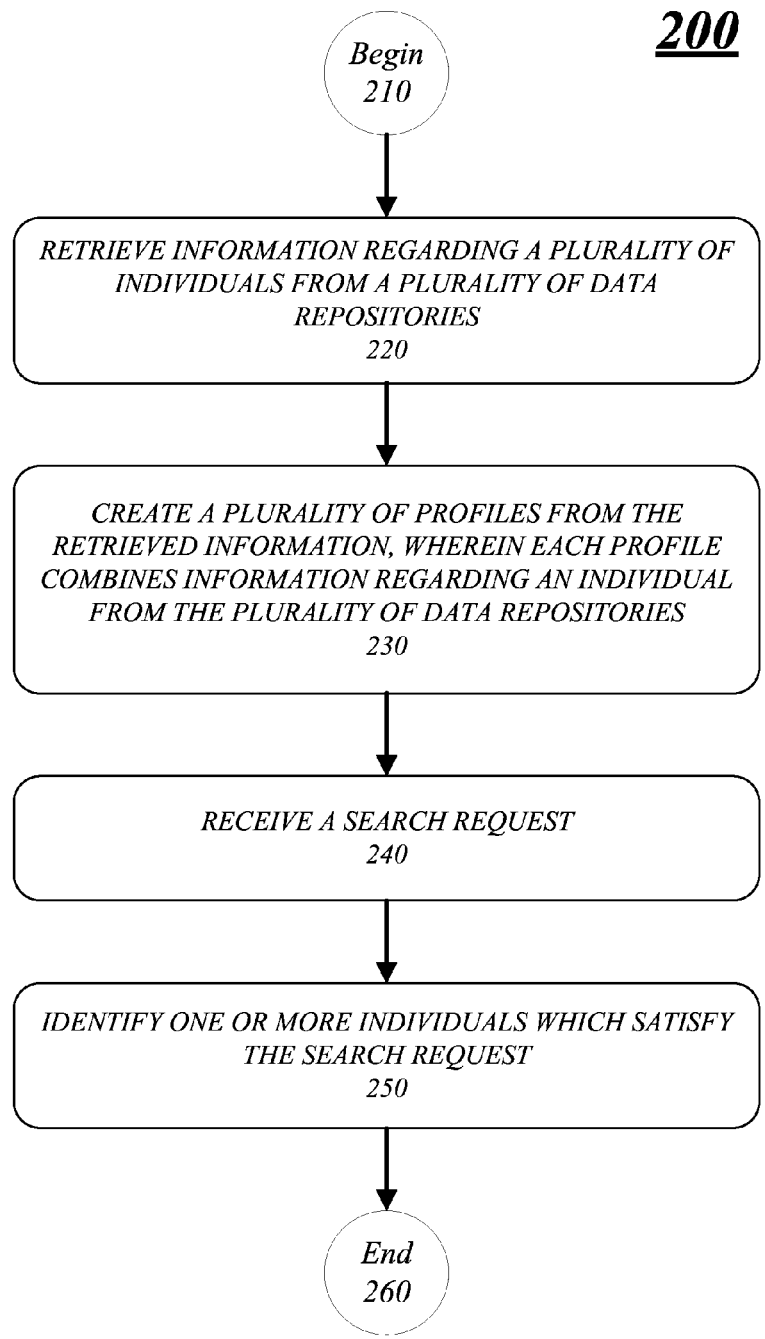
FIG. 2 illustrates an embodiment of a logic flow for the system of FIG. 1.

FIG. 2 illustrates one embodiment of a logic flow 200. The logic flow 200 may be representative of some or all of the operations executed by one or more embodiments described herein. For example, the logic flow 200 may represent operations for the profile system 100.

Operations for the logic flow 200 are initiated at block 210.

In block 220, information regarding a plurality of individuals is retrieved from a plurality of data repositories. In various embodiments, at least one of the plurality of data repositories may be a directory server storing address-book information, the information retrieved from the at least one data repository comprising address-book information from stored address books for the plurality of individuals. In some embodiments, the retrieved information may include pictures of the plurality of individuals.

In block 230, a plurality of profiles 165 are created from the retrieved information, wherein each profile 165 combines information regarding an individual from the plurality of data repositories 170a-n. In various embodiments, the created profiles 165 may comprise a retrieved picture of an individual combined with a profile 165 associated with the individual. In some embodiments, the created plurality of profiles 165 may comprise a hierarchical structuring of an organization, the hierarchical structuring automatically created based on the retrieved information regarding the plurality of individuals.

In block 240, a search request is received. In various embodiments, the search request may be received through an application programming interface (API).

In block 250, one or more individuals which satisfy the search request are identified. In various embodiments, the one or more identified profiles 165 may be returned using the API.

FIG. 3 illustrates an example search interface and search results for the profile system 100. It will be understood that the implementation of a search interface may be different from the illustrated example and may include additional features or information not depicted in the illustration. Further, it will be appreciated that in some embodiments that the process of searching and receiving results may make use of the previously-discus discussed API, wherein the search request, search results, and profile information are communicated using the API.

FIG. 3 illustrates a search window 300, such as a web browser window, with a search entry form 305, a search submission button 310, and an example search phrase "Xiong" 315 entered in the search-term entry form 305. This example may represent an employee at an organization attempting to identify or otherwise locate information on a fellow employee named 'Xiong.' It will be appreciated that while the illustrated search is for a name, the search may be performed using any information stored in the plurality of profiles. For instances, searches may be performed on the basis of title, department, contact information (phone, email, instant messaging identifier, address, office number, etc.), group, expertise, or tags. Further, while the illustrated example depicts a single search box, an advanced search page may also be used in which search terms are entered in a plurality of forms, each form associated with a particular type of information.

A plurality of search results may be provided, representing a set of matches or partial-matches between the search phrase and the stored profiles 165. As in the illustrated example, the search results may be organized into rows, with each row containing a view of a subset of the profile information for the associated individual so as to aid in the identification of which search results matches the desired individual. In the illustrated embodiment, this subset is organized into three columns: "Name I Title" 324, "Department" 326, and "Email Alias" 328 corresponding to information contained in the abbreviated profile views shown for the example search results 330, 340, 350, and 360. Further, each abbreviated profile view is shown with an associated profile picture for the individual.

Consider in the illustrated example that the user which inputted the search term "Xiong" 315 is looking for the individual "Jenee Xiong" who appears as the second search result 340. Based on the abbreviated profile view shown as search result 340, the user may be able to identify Jenee Xiong on the basis of their full name and title 344 "Jenee Xiong" and "Senior Project Manager," their department 346 "Services Engineering," their email alias 348 "jxiong" or their profile picture 342. It will be appreciated that the abbreviated profile view may contain more, less, or different information than depicted. Generally, an abbreviated profile view may comprise a view of any standardized subset of the profile information so as to aid in the identification of a searched-for individual. Generally, the profile information included in an abbreviated profile view may be limited to those elements which provide value for identifying the individual with whom the profile is associated, such as their name, picture, and a compact set of information indicating the individual's place within an organization. In some embodiments, the search results may be sorted according to one or more—or any—of the pieces of profile information displayed in the abbreviated view. For example, in the embodiment depicted in FIG. 3, a user viewing the search results might order them by name, as depicted, or might re-order them by title, department, or e-mail alias by selecting an appropriate user control.

It will be appreciated that in various embodiments different standardized subsets may be used for the abbreviated view of a profile 165, and that in some embodiments the subset use may be specified by an operator of a profile system 100, either as an organizational standard applied to all users or as a user-customizable subset based on their own preferences. In some embodiments, the subset used for the abbreviated profile view may be responsive to the type of search performed, such that a search based on an area of knowledge—for example, searching for a user with specific technical expertise—may result in more profile information related to the individual's technical expertise being included as part of the abbreviated profile views used to display search results.

Figure 4:
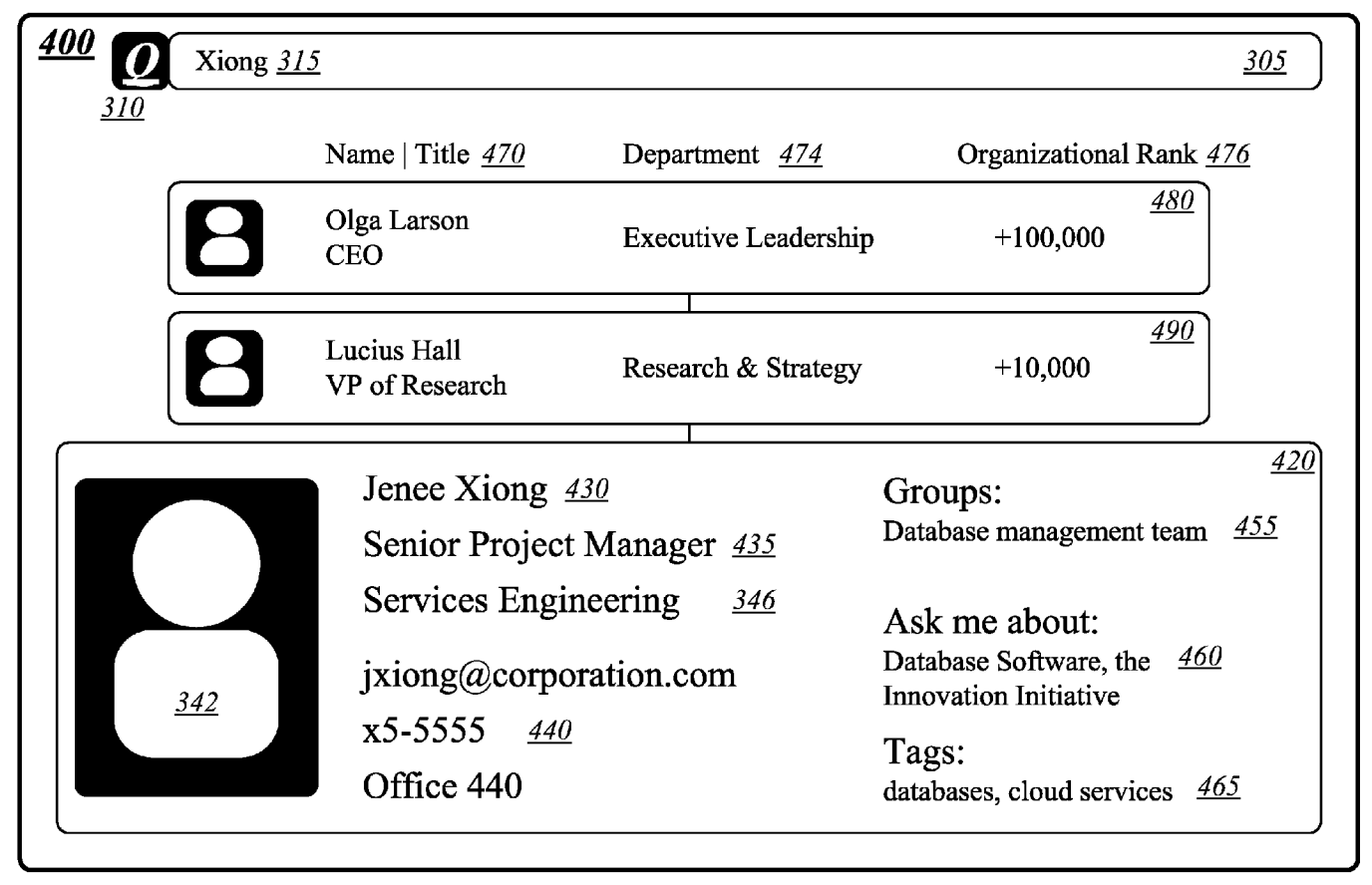

FIG. 4 illustrates a chain-of-command view 400 of a profile for a searched-for individual. As depicted, the chain-of-command view 400 comprises an expanded view of the profile 420 for the searched-for individual Jenee Xiong along with abbreviated profile views for their immediate supervisor 490 Lucius Hall and their supervisor's supervisor Olga Larson, the CEO of the company. In general, a chain-of-command view of a profile for an individual is a view depicting a standardized subset of that individual's profile along with abbreviated views of each link in a chain of supervision from the searched-for individual to the head of the organization. While the illustrated example of FIG. 4 shows only two links in this chain, it will be appreciated that there may be many more.

In the illustrated example, the expanded profile view includes the searched-for individual's name 430 "Jenee Xiong," their title 435 "Senior Project Manager," their department 346 "Services Engineering," their contact information 440, the groups to which they belong 455, their areas of expertise 460, tags associated with the individual 465, and their profile picture 342.

Generally, the expanded view of the profile 420 contains a standardized subset of the profile information for the searched-for user. It will be appreciated that in various embodiments different standardized subsets may be used, and that in some embodiments the subset use may be specified by an operator of a profile system, either as an organizational standard applied to all users or as a user-customizable subset based on their own preferences. In some embodiments, the subset used for the expanded profile view may be responsive to the type of search performed, such that a search based on an area of knowledge—for example, searching for a user with specific technical expertise—may result in more profile information related to the individual's technical expertise being included in the expanded profile view.

Similarly, the abbreviated profile view used for the chain-of-command may be the same abbreviated profile view used for showing search results or may be a different abbreviated profile view specific to displaying a chain of command. As before, the subset of profile information used in the abbreviated profile view for the chain-of-command may be standardized for all installations, may be customized by an operator on a per-installation basis, may be customized by the user, or may be responsive to the type of search performer. As depicted, abbreviated profile view used for the chain-of-command is organized into three columns: "Name|Title" 470, "Department" 474, and "Organizational Rank" 476 corresponding to information contained in the abbreviated profile views shown for the example chain-of-command 480 and 490. The organizational rank of an individual within an organization may correspond to a numerical representation of the scope of their authority within the organization. In some embodiments, the organization rank of an individual may equal the number of people within the organization subject to their supervision, including direct supervisees, their supervisees, and so on, which corresponds to the number of individuals in the subset of the hierarchy for the organization rooted at the individual.

Figure 5:
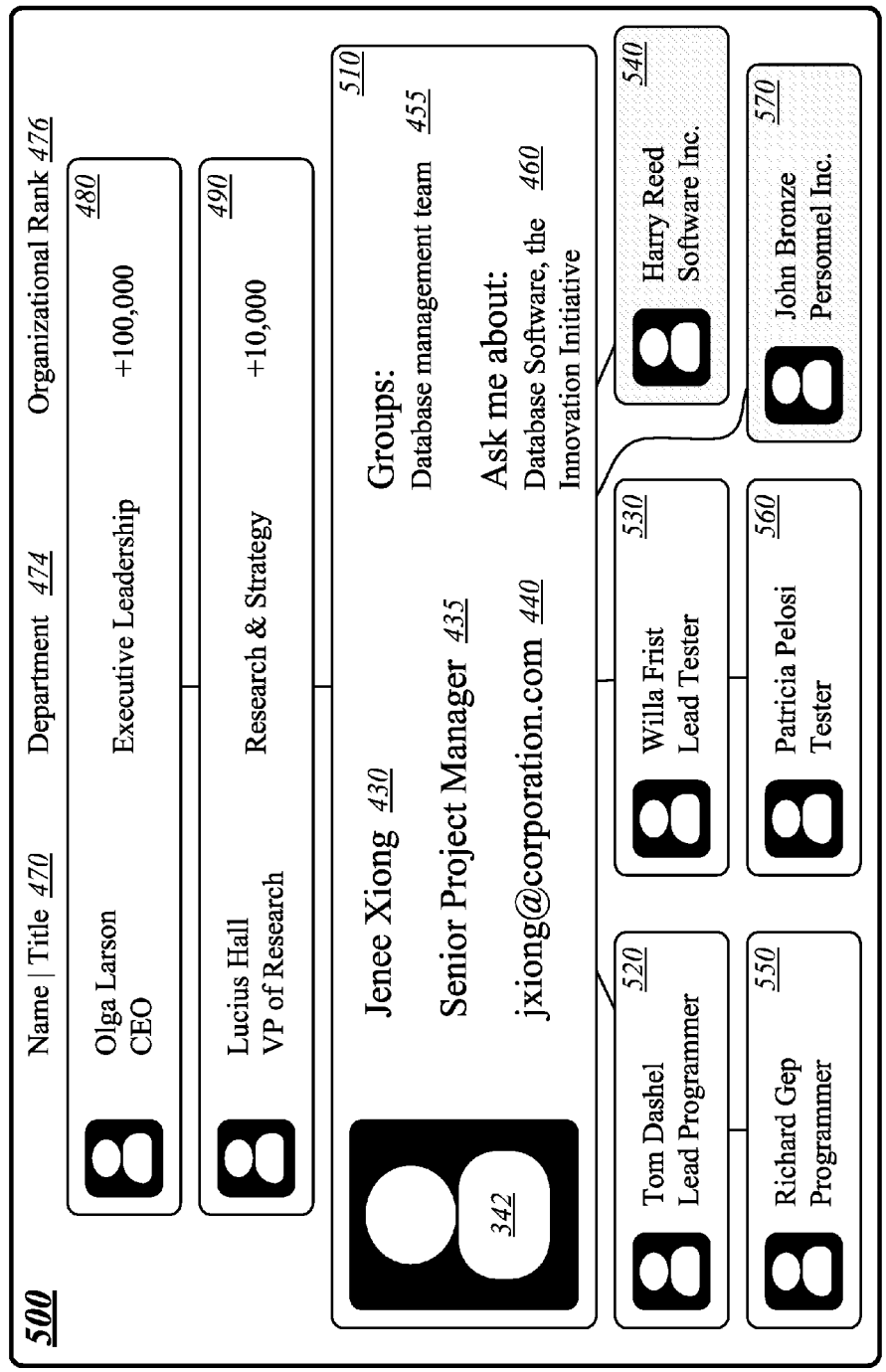
FIG. 5 illustrates a hierarchical view of a profile for a searched-for individual.

FIG. 5 illustrates a hierarchical view 500 of a profile for a searched-for individual. As shown, the hierarchical view 500 includes a compact view 510 of the profile for the individual, along with the abbreviated profile views for the chain-of-command 480 and 490, and in addition a plurality of supervisees for the searched-for individual. In general, a hierarchical view of a profile 165 for an individual may comprise a compact profile view for the individual, a view of the chain-of-command from the individual to the head of the organization, and a view of the profiles for one or more supervisees of the individual. In some embodiments, the one or more supervisees shown for the individual may comprise the full set of direct supervisees of the individual or may comprise the full set of all people within the organization under the individual's supervision, including indirect supervisees such as those supervised by the individual's direct subordinates. In some embodiments, the hierarchical view for a searched-for individual may include external contacts for the individual outside of the organization.

In the illustrates hierarchical view 500, the depicted supervisees include a first direct-supervisee 520, Tom Dashel, and Tom Dashel's sole direct-supervisee Richard Gep, a first indirect-supervisee 550 of Jenee Xiong. The depicted supervisees also include a second direct-supervisee 530, Willa Frist, and Willa Frist's sole direct-supervise Patricia Pelosi, a second indirect supervisee 560 of Jenee Xiong. The illustrated hierarchical view 500 also includes external contacts 540 and 570. As can be seen, the external contacts 540 and 570 are illustrated using a cross-hatched background. In some embodiments, the view of a profile for an external contact may contain some visual indicator that the view is for an external contact rather than a member of the organization. This visual indicator may comprise the use of a particular color, a particular symbol, a particular pattern, or any other visual mechanism for indicating a difference between a view of a profile for a member of the organization and a view of a profile for an external contact.

Figure 6:
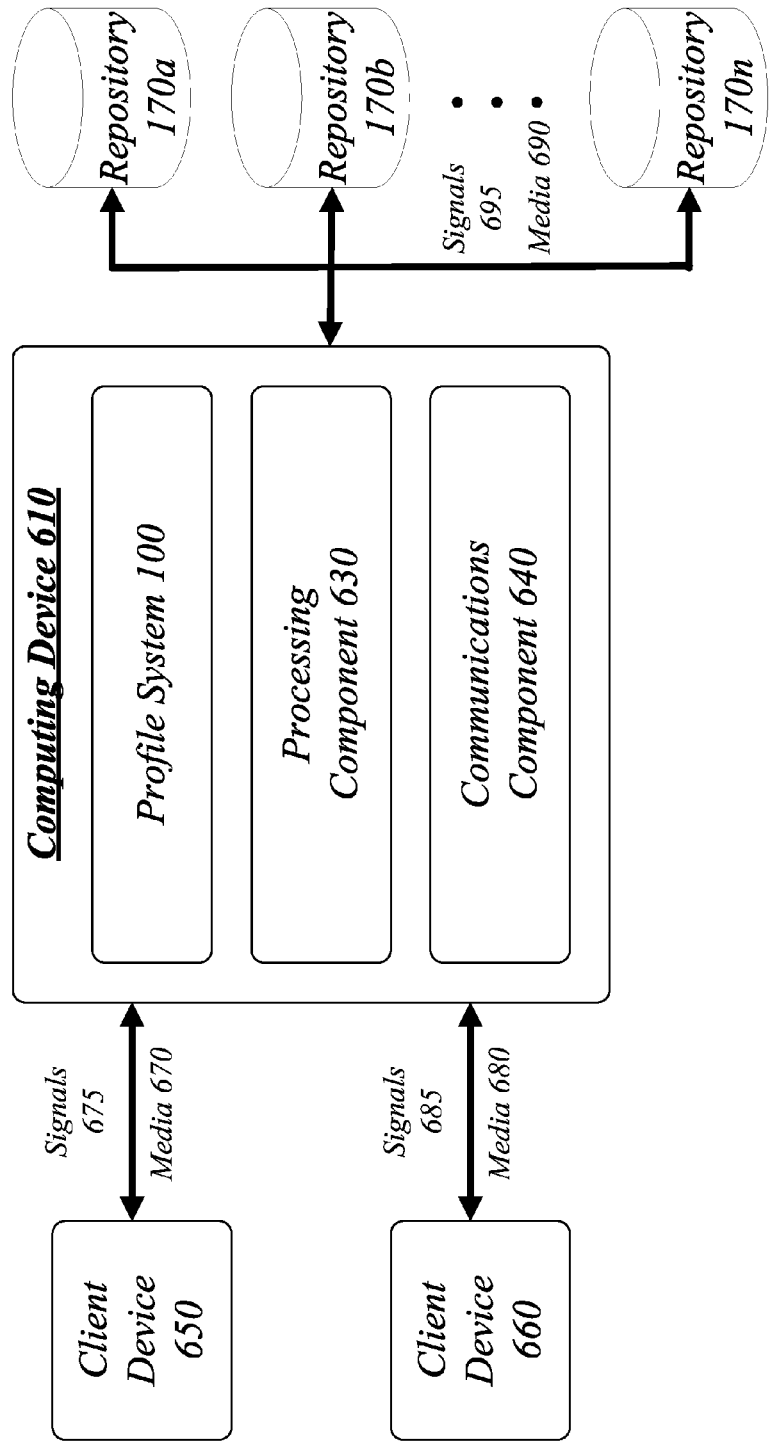
FIG. 6 illustrates an embodiment of a centralized system for the system of FIG. 1.

FIG. 6 illustrates a block diagram of a centralized system 600. The centralized system 600 may implement some or all of the structure and/or operations for the profile system 100 in a single computing entity, such as entirely within a single computing device 610.

The computing device 610 may execute processing operations or logic for the profile system 100 using a processing component 630. The processing component 630 may comprise various hardware elements, software elements, or a combination of both. Examples of hardware elements may include devices, components, processors, microprocessors, processor circuits, circuits, circuit elements (e.g., transistors, resistors, capacitors, inductors, and so forth), integrated circuits, logic devices, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 610 may execute communications operations or logic for the profile system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 670 and 680 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 670, 680, and 690.

The computing device 610 may communicate with other devices 650 and 660 over communications media 670 and 680 using communications signals 675 and 685 and with the repositories 170a-n over communications media 690 using communications signals 695 via the communications component 640. For example, client device 650 may comprise a device used by a first user for performing a search of profile system 100. Signals 675 sent over media 670 may comprise a search request sent from the client device 650 to profile system 100 and a search response sent from the profile system 100 to the client device 650. Client device 660 may comprise a device used by a second user for performing a manual update to a profile stored by profile system 100. Signals 685 sent over media 680 may comprise additional information sent from the client device 650 to profile system 100 for inclusion in a profile. Similarly, computing device 610 may be connected to a plurality of data repositories 170a-n and retrieve information from the data repositories 170a-n using signals 695 sent over media 690.

Figure 7:
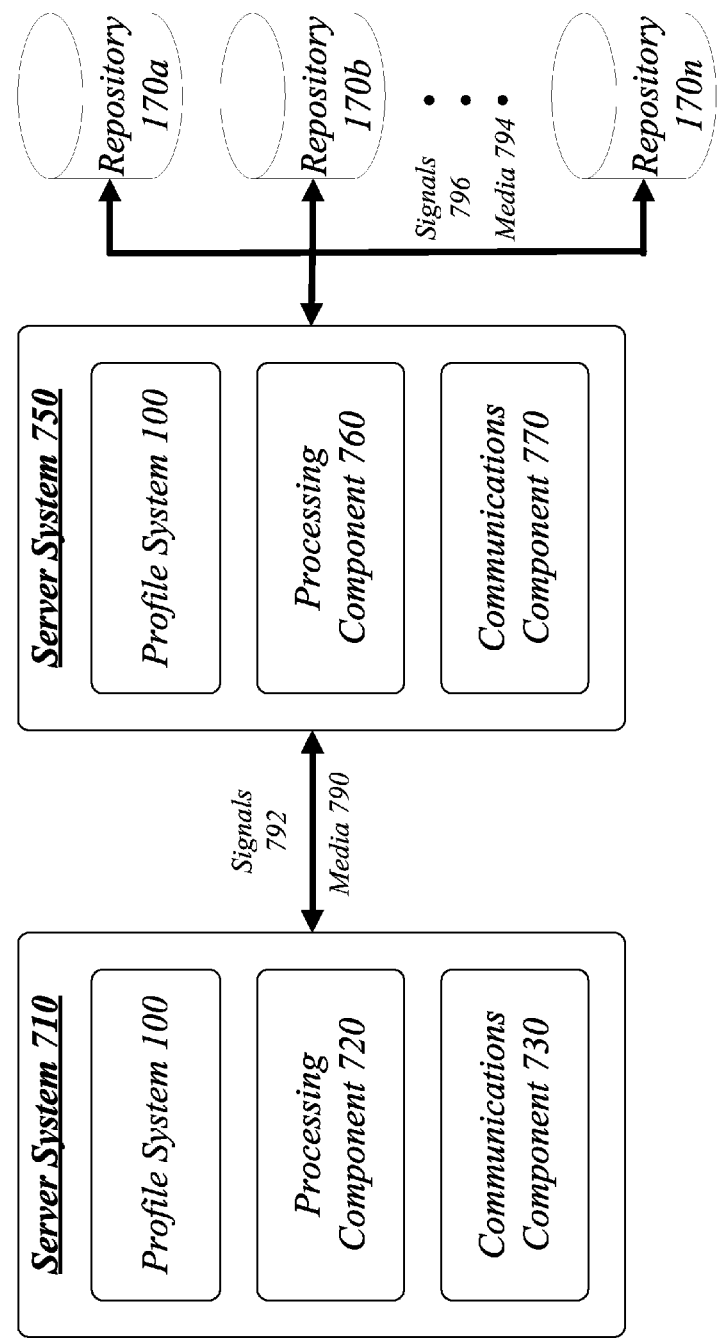
FIG. 7 illustrates an embodiment of a distributed system for the system of FIG. 1.

FIG. 7 illustrates a block diagram of a distributed system 700. The distributed system 700 may distribute portions of the structure and/or operations for the systems 100, 600 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The server systems 710 and 750 may process information using the processing components 720 and 760, which are similar to the processing component 630 described with reference to FIG. 6. The server systems 710 and 750 may communicate with each over a communications media 790 using communications signals 792 via communications components 730 and 770, which are similar to the communications component 640 described with reference to FIG. 6.

In one embodiment, for example, the distributed system 700 may divide the components of the profile system 100 across multiple computing entities. For instance, the server system 710 may implement a first portion of the components of the profile system 100 and the server system 750 may implement a second portion of the components of the profile system 100. In one embodiment, server system 750 may implement the information retrieval component 110, the profile construction component 120, and the profile modification component 130, and may, generally speaking, be responsible for the construction, maintenance, and storage of the plurality of profiles 165. As such, server system 750 may use communications signals 796 sent over communications media 794 to retrieve information from the plurality of repositories 170a-n. Server system 710 may implement the search component 140 and display component 150 and may, generally speaking, be responsible for interacting and managing the interaction with client devices making search requests and receiving profile information and views of profile information. It will be appreciated that other divisions of components may be envisioned.

In various embodiments, the server systems 710 and 750 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 710 and 750 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

Figure 8:
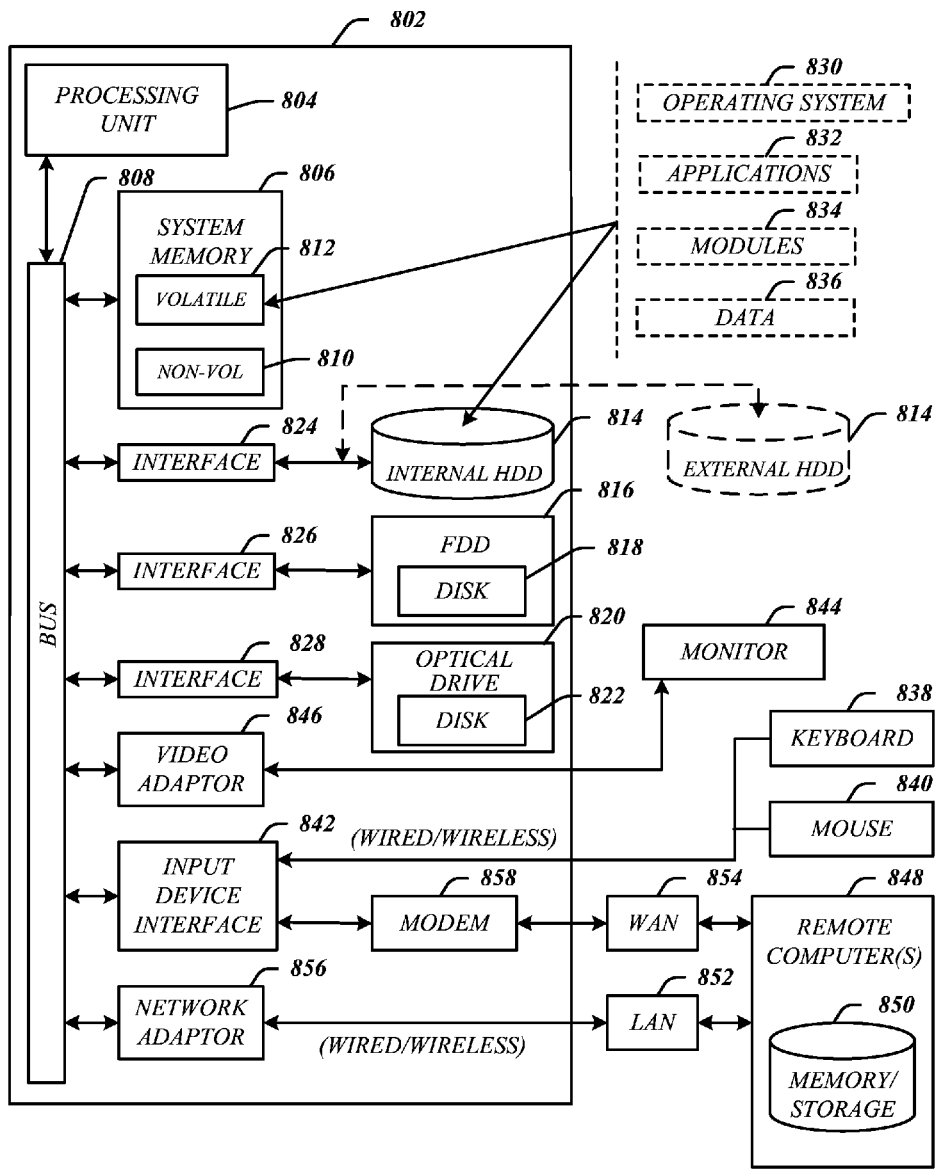
FIG. 8 illustrates an embodiment of a computing architecture.

FIG. 8 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, the information retrieval component 110, the profile construction component 120, the profile modification component 130, the search component 140, and the display component 150.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
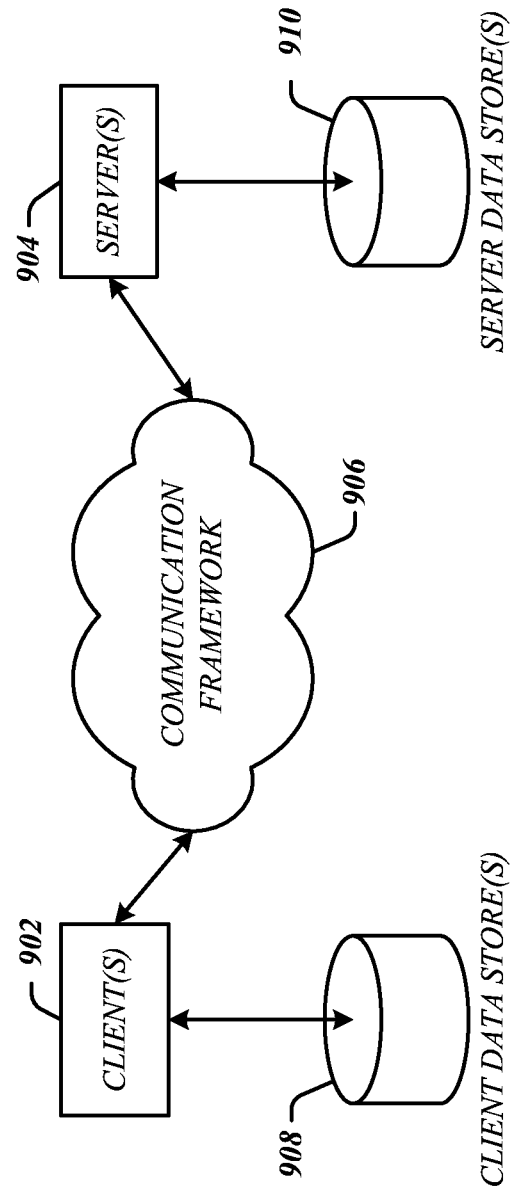
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client devices 180, 650, and 660. The servers 904 may implement the server systems 610, 710, and 750. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols, such as those described with reference to systems 100, 500, 600, and 700. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processor circuit;
   an information retrieval component operative on the processor circuit to retrieve information regarding a plurality of individuals from a plurality of data repositories, wherein at least one data repository in the plurality of data repositories is not searchable by an individual in the plurality of individuals who requested a visual representation of hierarchical relationships between the individual and the plurality of individuals;
   a profile construction component operative on the processor circuit to create a plurality of profiles from the retrieved information, wherein each profile combines information regarding an individual from the plurality of data repositories, and compare pairs of individuals to determine a first individual being of a same rank as a second individual, the first individual being of a higher rank than the second individual, or the first individual being of a lower rank than the second individual; and
   a display component operative to create a display view showing the visual representation of the hierarchical relationships between the individual and the plurality of individuals and a plurality of profile views for the plurality of individuals, wherein the visual representation of the hierarchical relationships between the plurality of individuals comprises a ranked ordering according to a status of each individual with respect to other individuals in a hierarchical structuring of the plurality of individuals and the plurality of profile views comprise at least one profile view shown with a picture of an individual.

2. The apparatus of claim 1, wherein the created plurality of profiles comprise the hierarchical structuring of an organization, the hierarchical structuring automatically created based on the retrieved information regarding the plurality of individuals.

3. The apparatus of claim 1, comprising a profile modification component operative to receive additional information from a user and to add the additional information to a profile.

4. The apparatus of claim 1, comprising a search component operative to receive a search request and to identify one or more profiles which satisfy the search request.

5. The apparatus of claim 4, wherein the search component is operative to receive the search request through an application programming interface, the search component operative to return the one or more identified profiles using the application programming interface.

6. The apparatus of claim 1, wherein the plurality of individuals comprise a first individual who is a member of an organization and a second individual who is an external contact and the display view shows a visual indicator for a profile view of the second individual to indicate a difference between the profile view of the second individual who is the external contact and a profile view of the first individual who is the member of the organization.

7. The apparatus of claim 6, wherein the profile view of the first individual is an expanded profile view comprising a picture, a name, a title, a group, an area of expertise, or contact information, and the profile view of the second individual is an abbreviated profile view comprising a picture or a name.

8. The apparatus of claim 1 wherein each profile further comprises an organizational rank, the organizational rank comprising a numerical representation of a scope of authority within an organization belonging to an individual associated with the profile.

9. The apparatus of claim 8 wherein the organizational rank comprises the number of people within the organization subject to supervision of the individual associated with the profile.

10. A computer implemented method, comprising:
    retrieving information regarding a plurality of individuals from a plurality of data repositories, wherein at least one data repository in the plurality of data repositories comprises organizational data for at least one individual in the plurality of individual but is not searchable by the at least one individual;
    creating a plurality of profiles from the retrieved information, wherein each profile combines information regarding an individual from the plurality of data repositories;
    determining, for each individual in the plurality of individuals, at least one of a supervisor or one or more subordinates among the plurality of individuals;
    receiving a search request, the search request comprising a search term;
    identifying one or more profiles which satisfy the search request by matching, at least partially, the search term with any information stored in the plurality of profiles; and
    creating a display view showing a profile for an individual, the display view comprising a visual representation of hierarchical relationships between the individual and one or more other individuals, wherein a hierarchical relationship between two individuals comprises a ranked ordering according to a status of each individual with respect to the other individual.

11. The method of claim 10, wherein at least one of the plurality of data repositories is a directory server storing address-book information, the information retrieved from the at least one data repository comprising address-book information from stored address books for the plurality of individuals.

12. The method of claim 10, wherein the retrieved information includes pictures of the plurality of individuals, wherein the profile construction component is operative to combine a retrieved picture of an individual with a profile associated with the individual.

13. The method of claim 10, wherein the created plurality of profiles comprise a hierarchical structuring of an organization, the hierarchical structuring automatically created based on the retrieved information regarding the plurality of individuals.

14. The method of claim 10, comprising:
    receiving additional information from a user; and
    adding the additional information to a profile.

15. The method of claim 10, comprising:
    receiving the search request through an application programming interface; and
    returning the one or more identified profiles using the application programming interface.

16. An article of manufacture comprising at least one of:
a computer-readable storage drive and a memory unit, containing instructions that when executed enable an organization search system to:
- retrieve information regarding a plurality of individuals from a plurality of data repositories, wherein at least one data repository in the plurality of data repositories is not searchable by at least one individual in the plurality of individuals who is using the organization search system;
- create a plurality of profiles from the retrieved information, wherein each profile combines information regarding an individual from the plurality of data repositories;
- compare pairs of individuals to determine a first individual being of a same rank as a second individual, the first individual being of a higher rank than the second individual, or the first individual being of a lower rank than the second individual:
- automatically create a hierarchical structuring of an organization based on the retrieved information regarding the plurality of individuals; and
- create a display view showing the plurality of profiles for the plurality of individuals, the display view comprising a visual representation of the hierarchical structuring comprises hierarchical relationships between the plurality of individuals and a plurality of profile views for the plurality of individuals, wherein the visual representation of the hierarchical relationships between the plurality of individuals comprises a ranked ordering according to a status of each individual with respect to other individuals and the plurality of profile views comprise at least one profile view shown with a picture of an individual.

17. The article of claim 16, wherein at least one of the plurality of data repositories is a directory server storing address-book information, the information retrieved from the at least one data repository comprising address-book information from stored address books for the plurality of individuals.

18. The article of claim 16, wherein the created plurality of profiles comprise the hierarchical structuring of an organization.

19. The article of claim 16, further comprising instructions that if executed enable the system to:
- receive additional information from a user; and
- add the additional information to a profile.

20. The article of claim 16, further comprising instructions that if executed enable the system to:
- receive a search request; and
- identify one or more profiles which satisfy the search request.

* * * * *